Oct. 16, 1945.   J. D. RYAN   2,386,980
MANUFACTURE OF LAMINATED SAFETY GLASS
Filed Jan. 31, 1940   2 Sheets—Sheet 1

Inventor
JOSEPH D. RYAN.
By Frank Fraser
Attorney

Oct. 16, 1945.     J. D. RYAN     2,386,980
MANUFACTURE OF LAMINATED SAFETY GLASS
Filed Jan. 31, 1940     2 Sheets-Sheet 2
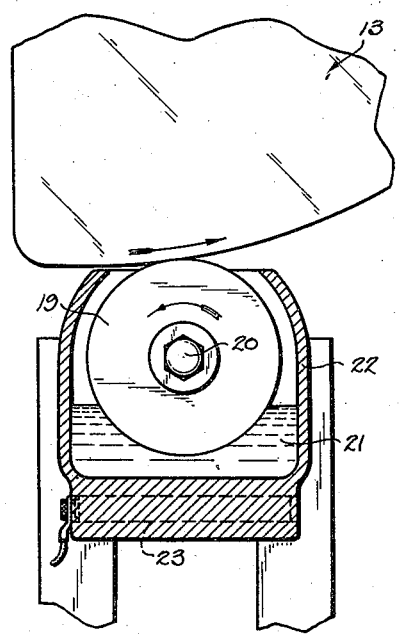
Fig. 4.
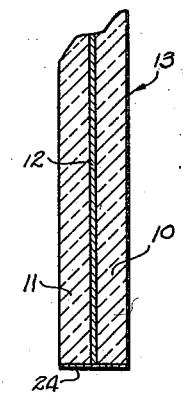
Fig. 5.
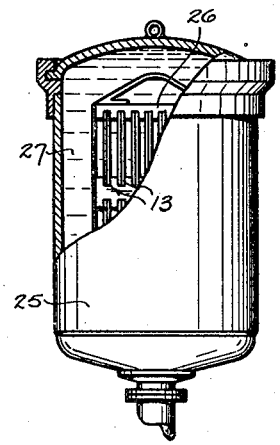
Fig. 6.
Fig. 7.
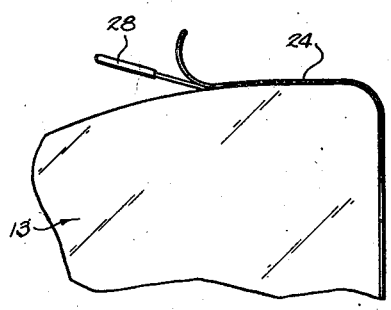
Inventor
JOSEPH D. RYAN.
By Frank Fraser
Attorney Patented Oct. 16, 1945

2,386,980

UNITED STATES PATENT OFFICE 2,386,980

MANUFACTURE OF LAMINATED SAFETY GLASS

Joseph D. Ryan, Toledo, Ohio, assignor to Libbey-Owens-Ford Glass Company, Toledo, Ohio, a corporation of Ohio Application January 31, 1940, Serial No. 316,615

1 Claim. (Cl. 154—2.71)

My invention relates to the manufacture of laminated safety glass and more particularly to the compositing of the assembled laminations to form a unitary structure.

Laminated safety glass ordinarily comprises two or more sheets of glass and one or more interposed layers of plastic material which may be formed of cellulose acetate but which are preferably of a synthetic resin material, such as, for example, the polyvinyl acetal resins.

After the glass sheets and plastic interlayer have been properly associated with one another to form what is termed a "sandwich," the assembly is subjected to a preliminary pressing operation by passing it between one or a plurality of pairs of rolls for the purpose of removing entrapped air from between the laminations and for also closing up the edges thereof. Subsequent to the preliminary pressing operation, the sandwiches are placed in an autoclave and subjected to the direct action of heated fluid under pressure whereby to effect the final compositing of the laminations.

Heretofore, when using cellulose acetate for the plastic interlayer, it has been customary to seal the edges of the laminated sheets after removal from the autoclave by first forming a channel around the edges of the laminated sheet and then filling this channel with a suitable sealing material. However, with the present use of synthetic resin plastics and particularly polyvinyl acetal resins, the sealing of the edges of the laminated sheets has been found to be unnecessary. Heretofore, when using either cellulose acetate or a synthetic resin for the plastic interlayer, trouble has been experienced during the final compositing of the laminations in the autoclave due to so-called "blow-ins." These blow-ins are caused by the autoclave fluid being forced in between the glass sheets at one or more points around the edges thereof.

When using cellulose acetate plastic as the interlayer and in sealing the laminated sheets after autoclaving, this problem is not so serious because the edge seal could be deepened in some cases to overcome the difficulty. However, when synthetic resin plastic is used for the interlayer and no edge seal is employed, even relatively small blow-ins approximately $\frac{1}{16}$ or $\frac{1}{8}$ inch in depth on the exposed edges of the laminated sheets lead to rejects and return of the glass to salvage. In some cases, it has been found expedient where the blow-in is only about $\frac{1}{16}$ inch in depth to grind away the glass on the edge, but this of course is a costly operation.

There are a number of different causes of blow-ins resulting during autoclaving of laminated safety glass. For instance, blow-ins arise due to poor gauge of the plastic, or they may result when the glass itself shows a rapid change in thickness from one closely adjacent point to another on the edges. Likewise, they may arise from internal strains in the plastic which tend to right themselves at the elevated temperatures employed in the final compositing operation, causing shrinkage of the plastic and entrance of the autoclave fluid. Due to the resilient character of the plastic, blow-ins are also sometimes produced by stretching of the plastic during the assembly operation. While all care is exercised to avoid such stretching, it has not been completely eliminated because of the problem of "after shrinkage" which is shrinkage resulting in the plastic from the washing operation after the plastic has been cut to pattern size.

It is the aim of my invention to reduce to a minimum, if not entirely eliminate, the formation of blow-ins in the laminated sheets during the final compositing thereof in the autoclave. Upon leaving the assembly run, the assembled laminations are subjected to a preliminary pressing operation to remove the entrapped air from therebetween and to also seal up the edges so as to prevent the ingress of autoclave fluid when subsequently subjected to final compositing in the autoclave. If the glass sheets and plastic interlayer are not of uniform flatness, it is possible after prepressing to detect areas along the edges where the glass and plastic are not in intimate contact. If such laminations are introduced into the autoclave, blow-ins will invariably be obtained on the autoclaved product.

To overcome this difficulty, platen or diaphragm presses have been used to produce closing in such areas with some degree of success. However, such a process is costly and has been found not to be entirely dependable. To completely close up some sandwiches in a platen or diaphragm press such high pressures and temperatures must be employed that some of the plastic is extruded at the edges, leading to a strained condition in those locations. On being then pressed in an autoclave and heated up to a temperature around 300 degrees F., the plastic having softened, the glass tends to spring back to the unstrained condition and autoclave fluid blows in between the laminations in these areas. Further, considerable glass breakage has been experienced in the repressing operation.

According to my invention, this manufacturing difficulty is overcome by coating the edges of the sandwiches either partially or in their entirety, if necessary, after prepressing and before being introduced into the autoclave, with an improved form of sealing material, said sealing material serving to effectually prevent ingress of the autoclave fluid between the laminations during autoclaving. The sealing material is applied to the edges of the sandwich to form a so-called surface seal, in that it covers the edges of the glass sheets and plastic interlayer and is not disposed within a channel or groove formed between the glass sheets. The sealing material is also of such character and so applied that it in no way interferes with the final compositing of the laminations. Further, the sealing material is readily removable from the edges of the laminated sheets after autoclaving.

Other objects and advantages of the invention will become more apparent during the course of the following description, when taken in connection with the accompanying drawings.

In the drawings, wherein like numerals are employed to designate like parts throughout the same:

Fig. 4 is a view illustrating diagrammatically the manner in which the sealing material may be applied to the edge portions of the sandwich;

Fig. 5 is a transverse sectional view through one of the sandwiches after sealing;

Fig. 6 is an elevation, partially in section, of an autoclave in which the final compositing operation is carried out; and Fig. 7 is a diagrammatic view illustrating the removal of the sealing material after the autoclave treatment.

Figure 1:
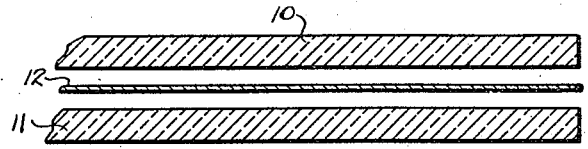
Fig. 1 is a sectional view showing two sheets of glass and an interposed layer of plastic material in properly assembled relation with respect to one another.

In the compositing of sheets of laminated safety glass according to my invention, two sheets of glass 10 and 11 are first assembled with an interposed layer of plastic material 12, as shown in Fig. 1, to form a "sandwich." The invention is of course not restricted to the use of any particular kind of glass and/or plastic interlayer, although it is preferred that the interlayer be formed of a synthetic resin material such as a polyvinyl acetal resin. It will also be apparent that three or more sheets of glass and two or more plastic interlayers may be associated with one another, depending upon the number of plies desired. Likewise, the plastic interlayer and/or inner surfaces of the glass sheets may or may not be coated with an adhesive or bond inducing medium.

Figure 2:
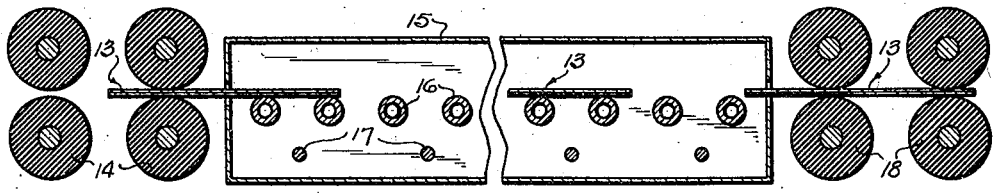
Fig. 2 is a vertical longitudinal section through one form of prepressing apparatus which may be employed in carrying out the invention.

After the laminations have been properly assembled, the sandwich, indicated by the numeral 13, is adapted to be subjected to a preliminary pressing operation, and in Fig. 2 is illustrated one form of apparatus which may be employed for this purpose. Thus, the sandwiches are initially subjected to a preliminary closing up pressure by passing them between one or more pairs of nipping rolls 14, the purpose of which is to remove entrapped air. From the nipping rolls, the sandwiches are passed through a heating chamber 15, wherein they are preferably heated to a temperature of approximately 175° to 200° F., said sandwiches being carried through said chamber upon a series of horizontally aligned rolls 16 or by any other suitable conveying means. The heating chamber 15 may be heated in any desired manner, such as by the electrical heating elements 17. Upon leaving the heating chamber, the sandwiches are passed through one or more pairs of pressing rolls 18, where they are given a relatively high pressure to completely seal up the edges of the sandwiches and thereby prevent the ingress of fluid when subsequently placed in the autoclave for final compositing.

Figure 3:
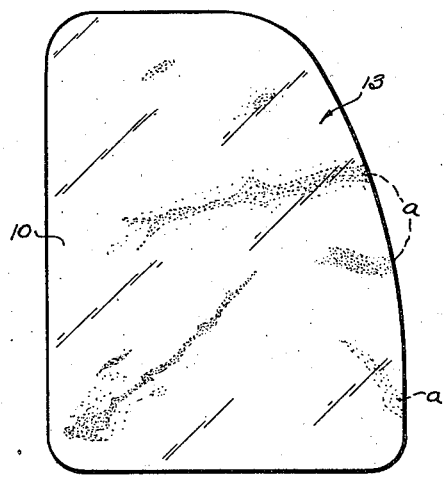
Fig. 3 is a view of one of the laminated glass sandwiches after being subjected to the preliminary pressing operation.

As stated above, if the glass sheets and plastic interlayer are not of uniform flatness, at this point in the operations, it is possible to detect areas along the edges where the glass and plastic are not in intimate contact. This condition is illustrated diagrammatically in Fig. 3, wherein the letter $a$ indicates spaced areas along the edge of the sandwich where the glass and plastic are not properly adhered or sealed up. If such laminations are introduced into the autoclave, blow-ins are invariably obtained at these areas due to the ingress of the autoclave fluid. As above pointed out, a number of different methods have been tried in an effort to overcome these manufacturing difficulties but that none of them have proven entirely dependable.

After considerable experimental and research work, I have finally developed a method of marginally sealing the laminated sheets against the ingress of the autoclave fluid. This method consists in coating the edge of the lamination either partially or in its entirety, if necessary, as it leaves the prepress apparatus. The operator stationed at the end of the prepress apparatus (Fig. 2), noting that a lamination is not satisfactorily closed up, places it to one side and this lamination is then suitably sealed according to my improved method.

Although the invention is not restricted to the use of any particular type of apparatus for effecting the sealing of the sandwich, one form of apparatus which has been satisfactorily employed for this purpose is illustrated in Fig. 4. This apparatus comprises a wheel 19, preferably of a relatively soft rubber, rubber composition, or the like, mounted upon a horizontal suitably driven shaft 20. The lower portion of the sealing wheel 19 is immersed in a supply of sealing material 21 carried in a receptacle 22 and maintained at the desired temperature and consistency by suitable heating means 23. The periphery of the wheel 19 is preferably flat so that in order to seal the sandwich 13 it is simply necessary for the operator to run the sandwich over the coated wheel. The sealing material adhering to the edges of the laminations serves to effectually seal the sandwich against the ingress of autoclave fluid in those areas $a$ which were not properly closed up in the prepressing operation. In sealing the sandwich 13 illustrated in Fig. 3, it is only necessary to run those areas $a$, over the sealing wheel, although the operator can of course seal the entire edge of the lamination if desired. The coating of sealing material applied to the edges of the laminations by the sealing wheel is indicated by the numeral 24 in Fig. 5.

In practice, it is not necessary to dry the coating of sealing material 24 before placing the sandwich in the autoclave 25 illustrated in Fig. 6. On the other hand, the lamination, after sealing, can be placed immediately in the autoclave and the final compositing operation completed. The autoclave 25 contains a suitable pressing fluid 27 heated to the desired temperature and a plurality of sandwiches 13 can be simultaneously composited by arranging them in a rack 26. While the invention is not restricted to the use of any particular fluid in the autoclave, I might suggest the use of a low viscosity oil from paraffin or naphthenic base crude oil having a flash point of about 360 to 370° F. This fluid will not tend to loosen the coating of sealing material but instead will serve to harden it so that it will adhere firmly to the edges of the laminations during autoclaving. Upon leaving the autoclave, it is found that the laminations are entirely free from blow-ins.

The sealing material preferably consists of a lacquer and forms a relatively thin coating upon the edges of the laminations. This coating must not only afford the proper protection against blow-ins during autoclaving but must also be readily removable after autoclaving. In fact, the sealing material used by me is preferably of such a character that upon washing of the laminated sheets after autoclaving, the water used in the washing operation will act to soften the sealing material and thus cause it to separate from the laminated sheets. On the other hand, the autoclave fluid ordinarily tends to harden the sealing material and its removal may be accomplished in a number of different ways such as by means of a razor blade or other suitable scraping tool 28 (Fig. 7).

After much research work and experimentation, I have developed a number of sealing lacquers, all of which work very satisfactorily. I have found, however, that some lacquers are more readily removed from the glass after autoclaving than others, but as regards their function of preventing blow-ins, all are satisfactory. The following are examples of three lacquers which I have found to work satisfactorily in production:

1

| | | |
|---|---|---|
| Cellulose acetate butyrate | pounds | 31.3 |
| Acetone | do | 59.5 |
| Cellosolve acetate | do | 36.5 |
| Dibutyl phthalate | do | 13.1 |
| Ethyl acetate | do | 83.0 |

2

| | | |
|---|---|---|
| Ethyl cellulose | grams | 120 |
| Cellosolve acetate | cc | 100 |
| Dibutyl phthalate | grams | 60 |
| Ethyl alcohol | cc | 480 |
| Toluol | cc | 120 |

3

| | | |
|---|---|---|
| Cellulose acetate | grams | 710 |
| Acetone | cc | 200 |
| Cellosolve acetate | cc | 850 |
| Dimethyl phthalate | cc | 284 |
| Ethyl acetate | cc | 212 |

Cellosolve is the monoacetic acid ester of monoethyl ether of ethylene glycol.

Of the three lacquers above set forth, the first example containing cellulose acetate butyrate appears at present to be most satisfactory, since it is more readily cleaned from the glass than the other two lacquers. However, I feel that by suitable changes in the composition of the lacquer, such as, change in plasticizers, cellulose base, solvents, etc., all of these materials can be equally readily removed from the edges of the glass.

It is to be understood that the form of the invention herewith shown and described is to be taken as the preferred embodiment of the same, and that various changes in the shape, size and arrangement of parts may be resorted to without departing from the spirit of the invention or the scope of the subjoined claim.

I claim,

The method of treating a glass-plastic sandwich in the manufacture of laminated safety glass to prevent blow-ins during autoclaving, comprising assembling two sheets of glass and an interposed layer of synthetic resin plastic material of substantially the same shape and size as each of the glass sheets to form a sandwich, subjecting said sandwich to a preliminary pressing operation, applying a relatively thin temporary, protective surface coating of a non-oil permeable lacquer having a cellulose derivative base over those portions of the edges of the glass sheets and plastic interlayer which were not properly closed by the prepress operation, subjecting the sandwich after such coating to the direct action of an oil under pressure in an autoclave to effect the final compositing of the glass and plastic laminations into a unitary structure, and then removing the temporary, protective coating from the edges of said structure after autoclaving.

JOSEPH D. RYAN.